United States Patent
Sharma

(10) Patent No.: US 8,116,309 B2
(45) Date of Patent: Feb. 14, 2012

(54) ENHANCED ETHERNET PROTOCOL FOR SHORTENED DATA FRAMES WITHIN A CONSTRAINED NEIGHBORHOOD BASED ON UNIQUE ID

(75) Inventor: Viswa Nath Sharma, San Ramon, CA (US)

(73) Assignee: PSIMast, Inc, San Ramon, CA (US)

( * ) Notice: Subject to any disclaimer, the term of this patent is extended or adjusted under 35 U.S.C. 154(b) by 560 days.

(21) Appl. No.: 11/838,198

(22) Filed: Aug. 13, 2007

(65) Prior Publication Data

US 2008/0056277 A1    Mar. 6, 2008

Related U.S. Application Data

(60) Provisional application No. 60/887,989, filed on Feb. 2, 2007, provisional application No. 60/822,171, filed on Aug. 11, 2006.

(51) Int. Cl.
*H04L 12/56* (2006.01)

(52) U.S. Cl. ......... 370/389; 370/392; 709/245; 709/246

(58) Field of Classification Search ............... 370/230, 370/230.1, 231, 235, 389, 392, 401, 465, 370/474–476; 709/245, 246
See application file for complete search history.

(56) References Cited

U.S. PATENT DOCUMENTS

| | | | | |
|---|---|---|---|---|
| 6,111,876 | A * | 8/2000 | Frantz et al. ................... | 370/392 |
| 7,088,714 | B2 * | 8/2006 | Athreya et al. ............... | 370/389 |
| 7,443,845 | B2 * | 10/2008 | Gai et al. ...................... | 370/389 |
| 7,633,956 | B1 * | 12/2009 | Parandekar et al. ......... | 370/401 |
| 7,738,467 | B2 * | 6/2010 | Albrecht .................. | 370/395.53 |
| 2003/0190168 | A1 * | 10/2003 | Song et al. ..................... | 398/168 |
| 2006/0013142 | A1 * | 1/2006 | Hongal et al. ............... | 370/248 |
| 2006/0203826 | A1 * | 9/2006 | Cho et al. ................. | 370/395.53 |
| 2007/0053353 | A1 * | 3/2007 | Lee et al. ...................... | 370/389 |
| 2007/0147393 | A1 * | 6/2007 | Wu et al. ................. | 370/395.53 |
| 2008/0013547 | A1 * | 1/2008 | Klessig et al. ........... | 370/395.53 |

* cited by examiner

*Primary Examiner* — Robert Scheibel
*Assistant Examiner* — Duc Duong

(57) ABSTRACT

An enhanced Ethernet protocol for computing and telecommunication supports a shortened frame size for communicating data payloads among selected devices within a constrained neighborhood based on a unique identification.

18 Claims, 7 Drawing Sheets

| DA (48 bits) | SA (48 Bits) | E-Type 8100 (16 bits) | 3-bit Priority + 1 bit CFI + 12-bit VLAN ID | E-Type (16 bits) | Payload |
|---|---|---|---|---|---|

MAC Learning Table

| MAC | PORT |
| --- | --- |
| (MAC-A1, VLAN 100) | 1 |
| (MAC-A2, VLAN 100) | 3 |
| (MAC-B1, VLAN 100) | 2 |
| (MAC-B2, VLAN 200) | 4 |

VLAN Table

| VLAN | PORT |
| --- | --- |
| 100 | 1,3 |
| 200 | 2,4 |
|  |  |
|  |  |

| DA (48 bits) | SA (48 Bits) | E-Type 8100 (16 bits) | 3-bit Priority + 1 bit CFI+ 12-bit VLAN ID | E-Type (16 bits) | Payload |
| --- | --- | --- | --- | --- | --- |

ENHANCED ETHERNET PROTOCOL FOR SHORTENED DATA FRAMES WITHIN A CONSTRAINED NEIGHBORHOOD BASED ON UNIQUE ID

PRIORITY CLAIMS

The present invention claims priority to U.S. Provisional Application Ser. No. 60/822,171, filed Aug. 11, 2006, entitled "Enhanced Ethernet Protocol for Shortened Data Frames Within a Constrained Neighborhood Based on Unique ID," and Ser. No. 60/887,989, filed Feb. 2, 2007, entitled "Processor Chip Architecture Having Integrated High-Speed Packet Switched Serial Interface," the disclosure of each of which is hereby incorporated by reference. The application is related to the utility patent application entitled "TELECOMMUNICATION AND COMPUTING PLATFORMS WITH SERIAL PACKET SWITCHED INTEGRATED MEMORY ACCESS TECHNOLOG," Ser. No. 11/828,329, filed Jul. 25, 2007, the disclosure of which is hereby incorporated by reference.

FIELD OF THE INVENTION

The present invention relates generally to the field of serial telecommunication and computing protocols, and more specifically to telecommunication and computing systems that utilize an enhanced communication protocol supporting a shortened frame size for more efficiently communicating data payloads among selected devices within a constrained neighborhood based on a unique ID within that neighborhood.

BACKGROUND OF THE INVENTION

A computing/communication network is generally understood to be an interconnected or interrelated group or system of computers, peripherals, terminals, servers, switches, routers and other hardware and software based devices connected by electrical, optical or wireless transmission media to enable the transmission and reception of communications. Traditionally, telecommunication networks that communicate voice, video and data over large distances were considered to be categorically different than computer or data networks that primarily communicate digital data, typically over shorter distances. This distinction is now disappearing and emerging networking concepts and technologies are causing a convergence of voice, video, data and wireless onto, for instance, a single, multiservice network paradigm based on Internet Protocol (IP) standards. Conventionally, information transfer in networks follows a communication protocol that prescribes how digital information is encapsulated for transmission between end-nodes in a network system. One popular network protocol is the Ethernet™ protocol.

The Ethernet protocol as defined by various standards, including the IEEE std. 802.3, published Mar. 8, 2002 is currently considered to be the dominant data networking technology. The Ethernet protocol is widely accepted as a means to communicate network packets to and from edge-devices (or end-stations) over a wider array of networks ranging from LANS to wireless networks. Ethernet has retained its viability as a communications technology even in the face of an explosive growth in demand for bandwidth and high data rate communications by evolving to meet extant network performance standards. While the original wirespeeds for Ethernet standards were only 10 megabits per second (Mbps), current rates are upwards of 40 gigabits per second (Gbps) with rates of 100 Gbps soon to be available. Ethernet® is a registered trademark of Xerox Corporation.

The Ethernet standard uses a packet (or frame) as a basic unit of data to communicate information over electrical, optical or wireless communications media to devices connected to the network. The Ethernet protocol specifies the rules (or standards) for constructing such packets or frames and this standardization has been one of the primary contributors to the success of the Ethernet protocol as a networking technology. The rules define, among other things, the minimum and maximum length of a packet and the information that must necessarily be present in each packet. A standard Ethernet packet is generally between 64 and 1518 bytes in length and includes 46 to 1500 bytes of data, plus a mandatory 18 bytes of header plus FCS information. Each packet (or frame) is required to include a source address (SA) and a destination address (DA) that uniquely identify the source and the recipient of the packet. In this regard, each network node (alternatively end-node, device, end-station, or edge-device) is associated with a unique Media Access Control (MAC) address that is 48 bits long.

Typically, the network comprises several local area networks (LANs), each of which may communicate through an intermediate network device, such as a bridge, switch or router, with the other LANs that comprise the network. The intermediate device does not originate traffic of its own although it may terminate (i.e. drop) packets that do not conform to the Ethernet standard (also known as "illegal packets"). Ethernet is a connectionless, broadcast based protocol intended for use in a shared medium. The intermediate devices use a forwarding table as well as the address information in the header of an incoming packet to decide where the incoming packet should be forwarded to. Forwarding tables can be permanently defined (static) or built by the intermediate device by learning the MAC addresses of devices on the LAN links. In this respect, every Ethernet compliant packet includes a mandatory 6-byte destination address (DA), a 6-byte source address (SA), two 2-byte E-type and a 4 byte FCS for a total of 20 bytes of packet overhead and 14 bytes of header overhead. A minimum Ethernet packet size of 64 bytes (not including the preamble) involves a header overhead of about (14/64)*100 or 22 percent. The size of the header affects the available bandwidth. It also affects the speed with which the header can be processed. Moreover, the Ethernet protocol imposes a fundamental limit on the global address space due to the finite number of address bits permitted in a Ethernet packet. The global address space limitation constrains the number of nodes in the network that can be explicitly addressed. Other nodes in the network may be considered to belong to a local network that is hierarchically below and extends from an explicitly addressed "root" node. The nodes in this local network may be addressed using logical addresses valid only in the local network. Computing and resolving such logical addresses imposes a computational overhead in addition to the header processing burden. Clearly, high-speed, Ethernet based communications in a local network may be problematic due to the latency introduced by header processing and bandwidth limits.

One of the approaches to address the aforementioned issues is the concept of a virtual local area network (VLAN). As opposed to a LAN, which represents a physical network system comprised of a plurality of network devices and the physical interconnection between them, such as for example, Ethernet™ or fiber optic links, a virtual local area network (VLAN) is logical segmentation of a single physical network into multiple networks. A virtual LAN (VLAN) is a collection of network nodes, perhaps on multiple physical LAN segments, that can communicate as if they were connected to the same physical LAN without the need to repetitively process the standard Ethernet header. A given set of network devices may logically belong to several VLANs each of which is capable of Ethernet based packet communication if the VLAN segmentation is done pursuant to the Institute of Electrical and Electronics Engineering (IEEE) 802.1Q draft standard Following the IEEE 802.1Q draft standard, the use of a Virtual LAN (VLAN) identification (ID) (VLAN ID) as prescribed in the Institute of Electrical and Electronics Engineering (IEEE) draft standard 802.1Q. VLANS are set up by inserting a tag, called a VLAN tag, into each Ethernet frame. The tagged frame carries VLAN membership information. The VLAN tag is 2 bytes in length. The last 12 bits of the tag is reserved for a VLAN identifier (VLAN ID). Tagging can be based on the source or destination Media Access Control (MAC) address. Each intermediate device maintains a table of MAC addresses and their corresponding VLAN memberships. VLAN-unaware devices transmit and receive normal MAC data frames, such as untagged data packets. VLAN-aware devices are capable of transmitting and receiving tagged data packets. The VLAN-aware devices switch packets based on the VLAN ID. The VLAN ID presents a smaller header processing overhead. This approach reduces the header processing overhead while a packet is being sent, but it does not change the overall length of the packets that must be communicated across the network. As noted above, an additional 2 bytes in the form of a 802.1q VLAN Tag added, are added to the header. For a minimum Ethernet packet size of 64 bytes (not including the preamble), the VLAN ID based approach introduces a header overhead of (20/64)*100 or about 31 percent.

It is well known that shorter packets dominate network traffic. In such instances, the information carried in the header is about the same as the actual data payload resulting in a significant header processing related overhead. Such a situation may arise, for example, where the packets represent small, periodic, distributed data transfers associated with cellular transmissions or Voice over Internet Protocol (VoIP) traffic. A prior art approach to improve the header overhead to data ratio is header compression. Header compression is typically used to reduce the header overhead when using protocols such as real time protocol (RTP), user datagram protocol (UDP) and Internet Protocol (IP) on slow and medium speed links such as, for example, an air link. Header compression involves the minimization of the bandwidth for information carried in headers by taking advantage of the fact that some fields in the headers of consecutive packets in a packet stream remain static or change in a predefined way. Currently, there are proposals to reduce the 40-byte RTP/UDP/IP header to 4-5 bytes for instance. An exemplary header compression scheme is described in S. Casner and V. Jacobson, "Compressing IP/UDP/RTP Headers for Low-Speed Serial Links," IETF RFC 2508, the contents of which are hereby incorporated by reference. These header compression methods have to compensate for packet loss due to link errors and link latencies to prevent the de-compressor from appending incorrect header information to an out of sequence packet.

One attempt to improve the VLAN tag header has been described in U.S. Pat. No. 6,975,627 to Parry et al. which discloses a modification of tag fields in Ethernet data packets that relies on the existence, in current Ethernet standards, of a requirement for a header that precedes a tag that is used to denote a number identifying a virtual local area network. The invention is based on the use of the VLAN tag header to convey the selected or proprietary information where the VLAN identification field is modified by inserting in place of the VLAN tag header a field of the same size including selected information. The inserted field may include a first field indicating the presence of the VLAN identification field and a second field of selected information. The main purpose of the Perry invention is to modify a packet with selected information on the assumption that the egress port is proprietary, thus avoiding the difficulties of techniques that include adding data before or after existing data fields in the Ethernet protocol. Parry discloses the use of auto-negotiation to confirm that devices connected by a data link are compatible so as to ensure that the data link between the devices which are to form a common logical entity must be such that every packet intended for transmission by way of the link has a VLAN tag header. Parry's scheme allows control information to be passed between the units of the stack, or in general, different units within a physical system, with no increase in bandwidth for tagged packets. The stack is a plurality of devices, such as a multiplicity of hubs or switches, coupled together so that from the point of view of the external network, the plurality of coupled or "stacked" devices acts as a single logical entity. Parry's scheme inherits the 42 bytes/packet frame processing overhead associated with 802.1q Ethernet as previously described.

One area where the issue of header overhead takes on special importance is where Ethernet switching fabrics are utilized as backplane fabrics in a computing/communication system. US Publ. Appl. No. 20050091304, for example, discloses a control system for a telecommunication portal that includes a modular chassis having an Ethernet backplane and a platform management bus which houses at least one application module, at least one functional module, and a portal executive. In this patent application, a 1000 BaseT (Gigabit Ethernet) backplane provides a packet-switched network wherein each of the connected modules acts as an individual node on a network in contrast to a conventional parallel bus connection such as a PCI bus. US Publ. Appl. No. 20060123021 discloses a hierarchical packaging arrangement for electronic equipment that utilizes an Advanced Telecommunication Computing Architecture (ATCA®) arrangement of daughter boards in the for an Advanced Mezzanine Card (AMC™) that are interconnected with a hierarchical packet-based interconnection fabric such as Ethernet, RapidIO, PCI Express or Infiniband. RapidIO is a trademark of the RapidIO Trade Association. PCI Express is a trademark of the PCI-SIG. InfiniBand is a trademark of the IBTA (Infini-Band Trade Association). In this arrangement, the AMCs in each local cube are connected in a hierarchical configuration by a first, lower speed interface such a Gigabit Ethernet for connections within the local cube and by a second, higher speed interface such as 10 G Ethernet for connections among cubes. AdvancedTCA and the AdvancedTCA logo are registered trademarks of the PCI Industrial Computers Manufacturers Group. ATCA and the ATCA logo are trademarks of the PCI Industrial Computers Manufacturers Group. Other names and brands may be claimed as the property of others.

The problems of an Ethernet-switched backplane architectures in terms of latency, flow control, congestion management and quality of service are well known and described, for example, by Lee, "Computation and Communication Systems Need Advanced Switching," *Embedded Intel Solutions*, Winter 2005. Intel is a registered trademark of Intel Corporation or its subsidiaries in the United States and other countries. These issues have generally discouraged the adoption of serial I/O protocols for communications between processors and memory that would typically be limited to the smaller physical dimensions of a circuit board or a computer or communication rack or cabinet having multiple cards/blades interconnected by a backplane. Instead, the trend has been to increase the capacity of individual chips and the size of each of the server blades in order to accommodate more processors and memory on a single chip or circuit board, thereby reducing the need for processor and memory interconnection over the backplane.

Another fundamental problem with Ethernet backplanes is that the standard Ethernet frames are less efficient than other packet based backplane technologies because of excessive packet (or frame) overhead which requires additional backplane bandwidth. For a line card to support a rate above 1 Gbit/s, would require the provisioning of a 10-Gbit/s Ethernet backplane link. In addition to the frame processing overhead, standard Ethernet lacks effective mechanisms for flow control, congestion management, and high availability. Although Ethernet provides three priority bits in the VLAN tag that can be used to provide such mechanisms, there is no industry standard on how to use these bits. Ethernet has no class based flow control mechanism, and only supports an XON/XOFF mechanism in some applications. Since most prior art systems utilize layer 2 Ethernet switching which does not have these QoS or HA features, these prior art systems are unlikely candidates for solutions that would overcome the limitations of the Ethernet backplanes.

Another downside of using Ethernet as a backplane switching fabric for silicon-to-silicon interconnect is the lack of an infrastructure to handle congestion management. This aspect is described in Robert Brunner, Shashank Merchant, "*Congestion Management Requirements and Proposals—A TEM's View*", the contents of which are incorporated hereby in there entirety. The congestion may arise from, for example, an unavoidable rate mismatch between the blades and between multiple chasses. Unfortunately, unlike communications over a computer network where some latency is tolerable, intra-device and inter-blade communications cannot tolerate packets being discarded in the switching fabric.

While many of the above mentioned limitations could be overcome by employing new mechanisms that utilize non-Ethernet components, such an approach cannot avoid the penalty of losing the cost advantages gained through Ethernet's economies of scale. An exemplary non-standard mechanism would entail appending data onto the beginning or end of an existing packet's data field. Recall that standard Ethernet packets have a prescribed maximum length. Appending data to an Ethernet packet can result in an illegal packet, i.e. one whose length exceeds the maximum packet length. An illegal packet will likely be ignored or dropped by intermediate devices as the packet progresses thorough the network.

In view of the above, it would be advantageous to provide an enhanced Ethernet protocol that could overcomes the shortcomings of the existing approaches to improving header efficiency and, particularly, that could improve over the prior art Ethernet switching backplanes in the area of header overhead, link utilization, quality of service (QoS), high availability (HA), and latency while being inherently secure from out-of-the-system snooping.

SUMMARY OF THE INVENTION

The present invention is directed to an enhanced Ethernet communication protocol that can support a standard as well as a non-standard (i.e. shortened) Ethernet frame size for more efficiently communicating data payloads among selected devices within a constrained neighborhood based on a unique address for each device within that neighborhood. In one embodiment, the enhanced Ethernet protocol utilizes a VLAN like tagged Ethernet frame (in a manner similar to the IEEE 802.1Q standard) and each edge node/device/card in a local network/constrained neighborhood is assigned a VLAN-ID like identifier which uniquely identifies that node. Ethernet data packets associated with the particular edge-node are identified and classified within the constrained neighborhood of this VLAN like domain using this VLAN-ID like identifier and therefore can be communicated by an Ethernet switch inside of the constrained neighborhood of this VLAN like domain based on the VLAN-ID like Unique ID instead of the conventional source address (SA)/destination address (DA) information in the standard Ethernet protocol. In one embodiment, the VLAN, VLAN-ID and Ethernet data frames can conform to the IEEE 802.1Q standard. In this way, the present invention renders the SA/DA fields redundant thereby allowing their use for carrying bits comprising data payloads. In this manner, the overhead efficiency of the packet transfer may be increased, the length of the packet may be decreased, or a combination of both while leaving intact the ability to utilize standard Ethernet based packets and network constructs.

In one embodiment, a single enhanced Ethernet frame format in accordance with the present invention may be utilized among end stations and/or edge-devices in a local network/constrained neighborhood. In another embodiment, the present invention makes use of the variable features to provide a plurality of enhanced Ethernet frame formats. Each frame format representing an optimal packet configuration for the parameters governing communications between a pair of edge-devices, for example. In an exemplary embodiment of the present invention, these parameters may be arrived at by the process of auto-negotiation. In another embodiment, the parameters may reflect the size of each flow between the two edge-devices, the frequency of such a flow and even a QoS with which the flow is to be delivered.

In one embodiment, the present invention is implemented for an Ethernet switching fabric backplane of a computer system in accordance with the present invention is implemented as a multi-card Advanced Mezzanine Card (AMC) computer system based on an advanced TCA packaging arrangement having at least one processor card, and, optionally, a graphics processor card, a hard disk drive card and a memory card that are all interfaced to a management card having a multi-port Ethernet switch. All of the processor cards and the memory card are connected via a backplane with the multi-port Ethernet switch on the management card as the inter-card Ethernet switched fabric for the computer system via bit stream protocol processor chips located on each card. In one embodiment, the computer system is housed in a 3×2 picoTCA complaint packaging arrangement with redundant power supplies and shelf management functionality. In this embodiment, conventional microprocessor cards may be utilized with a serial bit stream processor such as for example, a bit stream protocol processor as described below, coupled on each processor card to the north-side bridge chip to package all off-board communications as high-speed Ethernet switched packets and a bit stream protocol processor is also utilized on the extended memory card to interface between a memory controller chip and the Ethernet fabric of the computer system.

In one embodiment, the inter-card Ethernet switched fabric is accomplished through a 10 GigE Ethernet interface via a bit stream protocol processor or other suitable processor adapted for serialized protocol processing and interface logic separate from the microprocessor/controller chip and a 10 G Ethernet interface. The bit stream protocol processor encapsulates the memory address and control information like Read, Write, number of successive bytes etc, as an Ethernet packet and the memory provisioned on the processor, decodes it, performs the action and encapsulates the result on to Ethernet, which is decoded by the bit stream protocol processor.

In one embodiment, a 10 G connection can be established between the elements on a blade, board or card via the bit stream protocol processor and interface logic. In another embodiment, a plurality of blades are configured to permit Ethernet connectivity over a backplane and may be communicatively coupled using a non-blocking, Ethernet based switching fabric. In still another embodiment, a plurality of processors are configured to permit Ethernet connectivity with main memory located on separate blades, boards or cards, or even in separate shelves or chassis over cabled connections and may be communicatively coupled using a non-blocking, Ethernet based switching fabric.

The above summary of the various embodiments of the invention is not intended to describe each illustrated embodiment or every implementation of the invention. The figures in the detailed description that follow more particularly exemplify these embodiments.

BRIEF DESCRIPTION OF THE DRAWINGS

The invention may be more completely understood in consideration of the following detailed description of various embodiments of the invention in connection with the accompanying drawings, in which.

Figure 1:
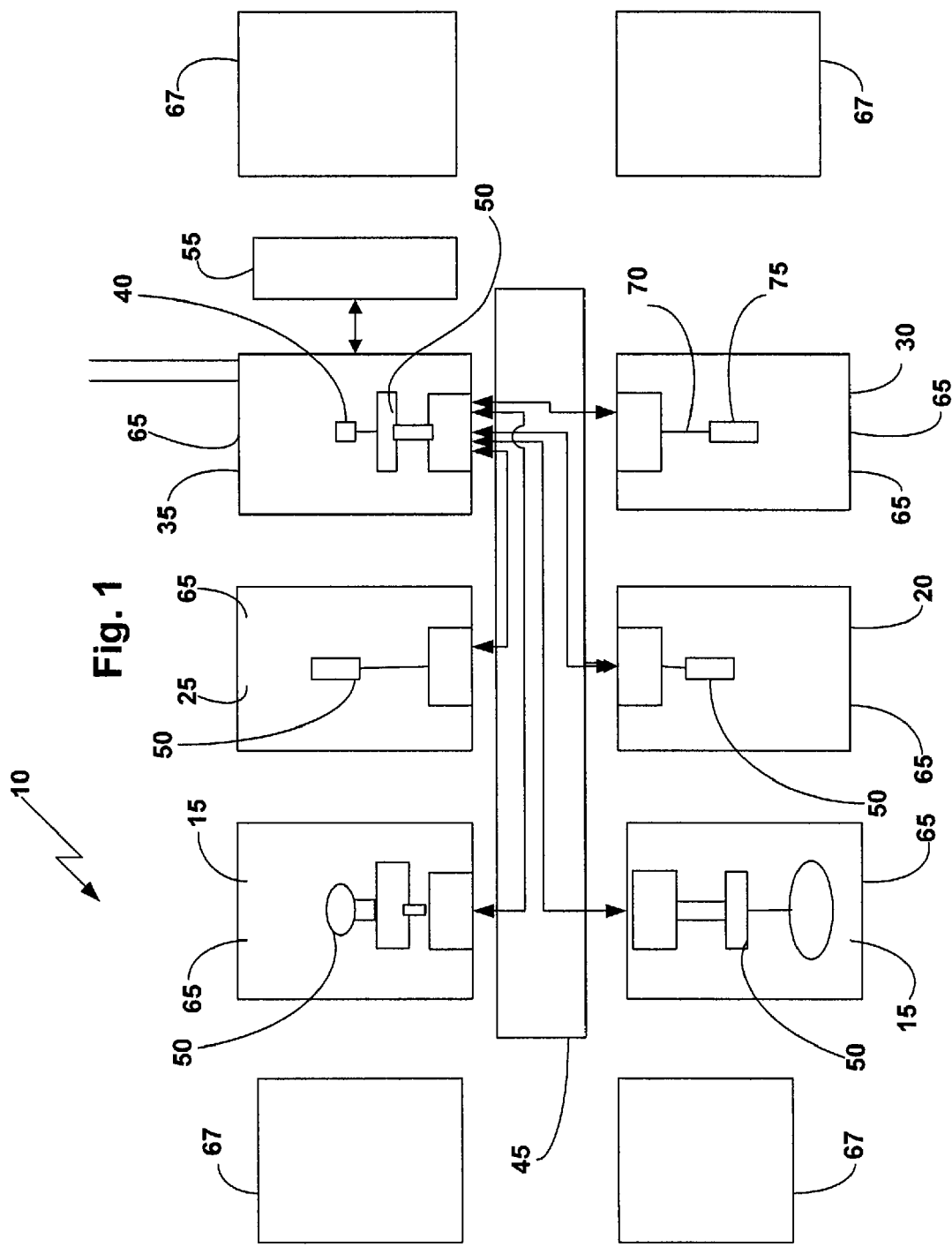
FIG. 1 depicts a block diagram of a computing system in which one embodiment of the present invention is exemplified.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF THE PREFERRED EMBODIMENTS

The Ethernet protocol that is the subject of the present invention is defined, for example, by IEEE Standard 802.3, published Mar. 8, 2002, although other Ethernet protocols presently known or to be adopted that conform to other industry standards are also included within the scope of the present invention. It will also be appreciated that the Ethernet protocol is presented for ease of description and by way of exemplifying the various embodiments of the present invention but not by way of limitation. Other protocols may be used within the scope of the present invention and the invention is not limited by the particular protocol employed. In unrelated embodiments, the present invention admits separate protocols within each constrained neighborhood (or portions thereof) of the system.

FIG. 1 depicts a computer system 10 in accordance with one embodiment of a local network/constrained neighborhood of the present invention that is implemented as a multi-card Advanced Mezzanine Card (AMC) computer system based on an advanced TCA packaging arrangement having at least one processor card 15, and, optionally, a graphics processor card 20, a hard disk drive card 25 and an extended memory card 30 that are all interfaced to a manager card 35 having a multi-port Ethernet switch 40. All of the processor cards and the memory card are connected via a backplane 45 with the multi-port Ethernet switch 40 on the management card 35 as the inter-card Ethernet switched fabric for the computer system via at least one processor chip located on each card, wherein the processor chip is adapted to process serialized protocols, such as for example, a bit stream protocol processor chip 50 located on each card of the exemplary embodiment of FIG. 1.

In another embodiment, the computer system 10 is housed in a 3×2 MicroTCA™ based packaging arrangement with redundant power supplies 55 and shelf management functionality 60 for each 3-wide MicroTCA™ shelf that can implement a picoTCA packaging arrangement. In this embodiment, conventional microprocessor MicroTCA cards 65 may be utilized with a bit stream protocol processor chip 50 coupled on each processor card 65 to the north-side bridge chipset 68 via for example, a front-side bus 70, to package all off-board communications as high-speed Ethernet switched packets and a bit stream protocol processor chip 50 is also utilized on the extended memory card 30 to interface between a memory controller chip 75 and the Ethernet fabric 45 of the computer system.

In the exemplary embodiment of the present invention described above, and as illustrated in FIG. 1, the computer system includes a plurality of cards, such as for example, the MicroTCA cards 65, that are dimensioned to conform to an industry standard and configured to be received in an enclosure whose dimensions and operability are also prescribed by the same or an alternative industry standard, such as for example, the MicroTCA™ based packaging arrangement. The cards and enclosure cooperatively constitute the computing/communication processing system of the present invention. The industry standard may be compatible with the MicroTCA standard, as set forth above, or the ATCA standard well known in the art. The enclosure is configured to receive a plurality of cards, although in a specific embodiment, the functionality of all or a portion of the cards may be presented on a single card, such as for example, in a single board computer or other single card based devices without digressing from the present invention. As illustrated in FIG. 1, in these exemplary embodiments, each card may be differentiated in terms of the functionality it is configured for. For example, the card may be a memory card, a processor card, a storage area network card, a secondary processor card, a server card, a secondary fabric card and so forth. Additionally, the enclosure may accept modules such as the fan modules 67 that are not based on the AMC™ or other industry standard. In particular embodiments, each card may be provided with at least one processor chip located on the card, wherein the processor chip is adapted to process serialized protocols, such as for example, a bit stream protocol processor chip 50 located on each card of the exemplary embodiment of FIG. 1.

Figure 2:
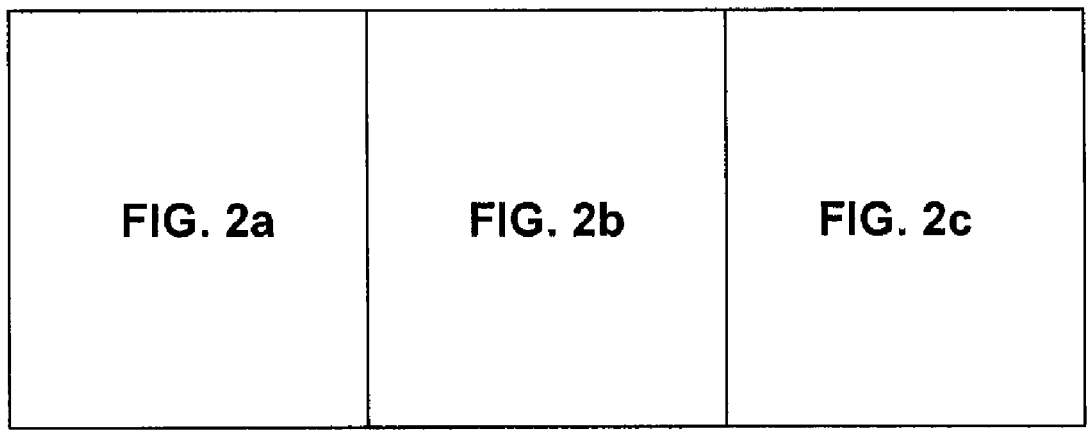
FIG. 2 depicts a functional block diagram of an exemplary architecture of a bridging chip located on a single circuit board configured as a processor card in accordance with one embodiment of the present invention.
Figure 2A:
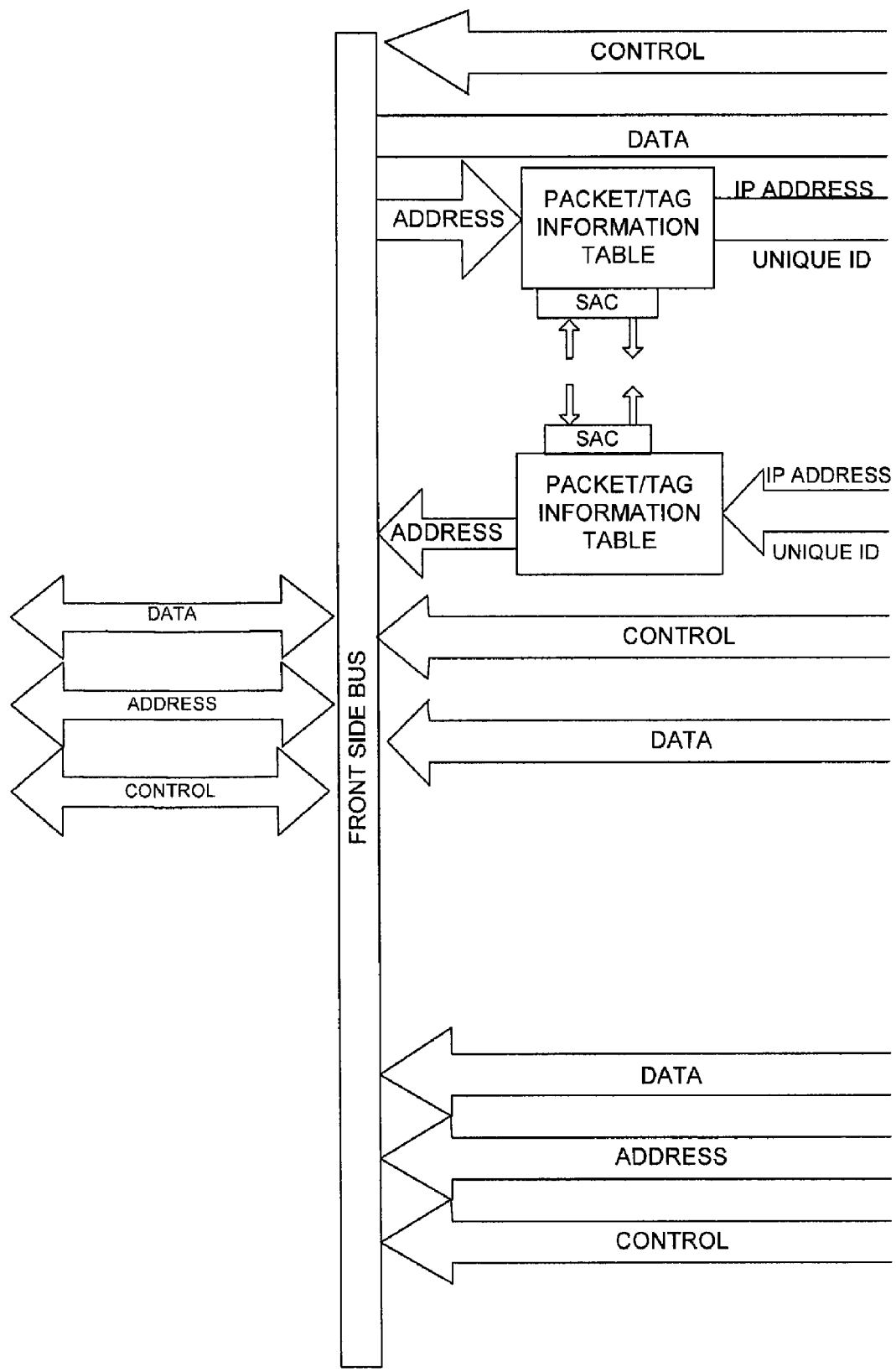
Figure 2B:
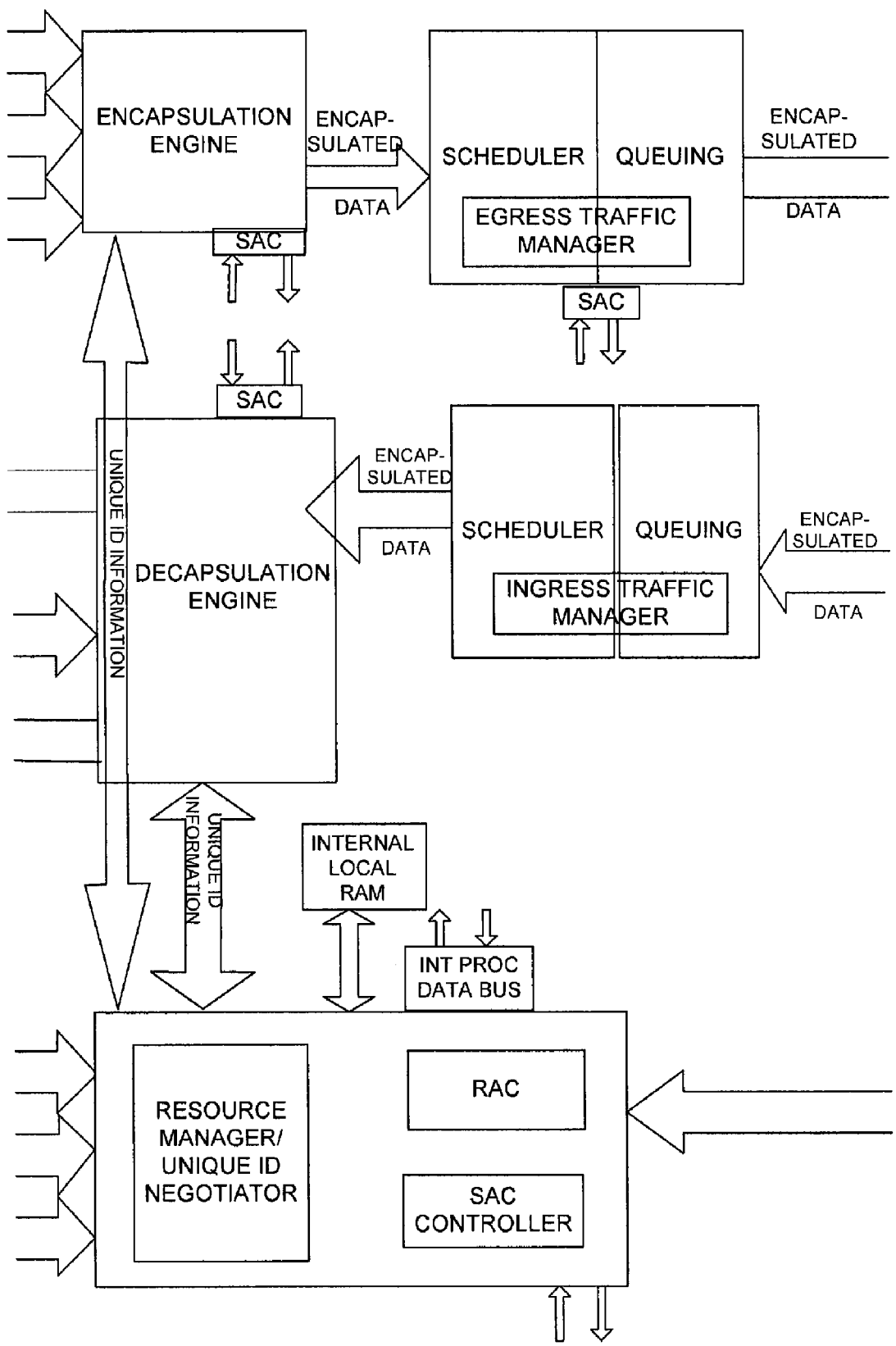
Figure 2C:
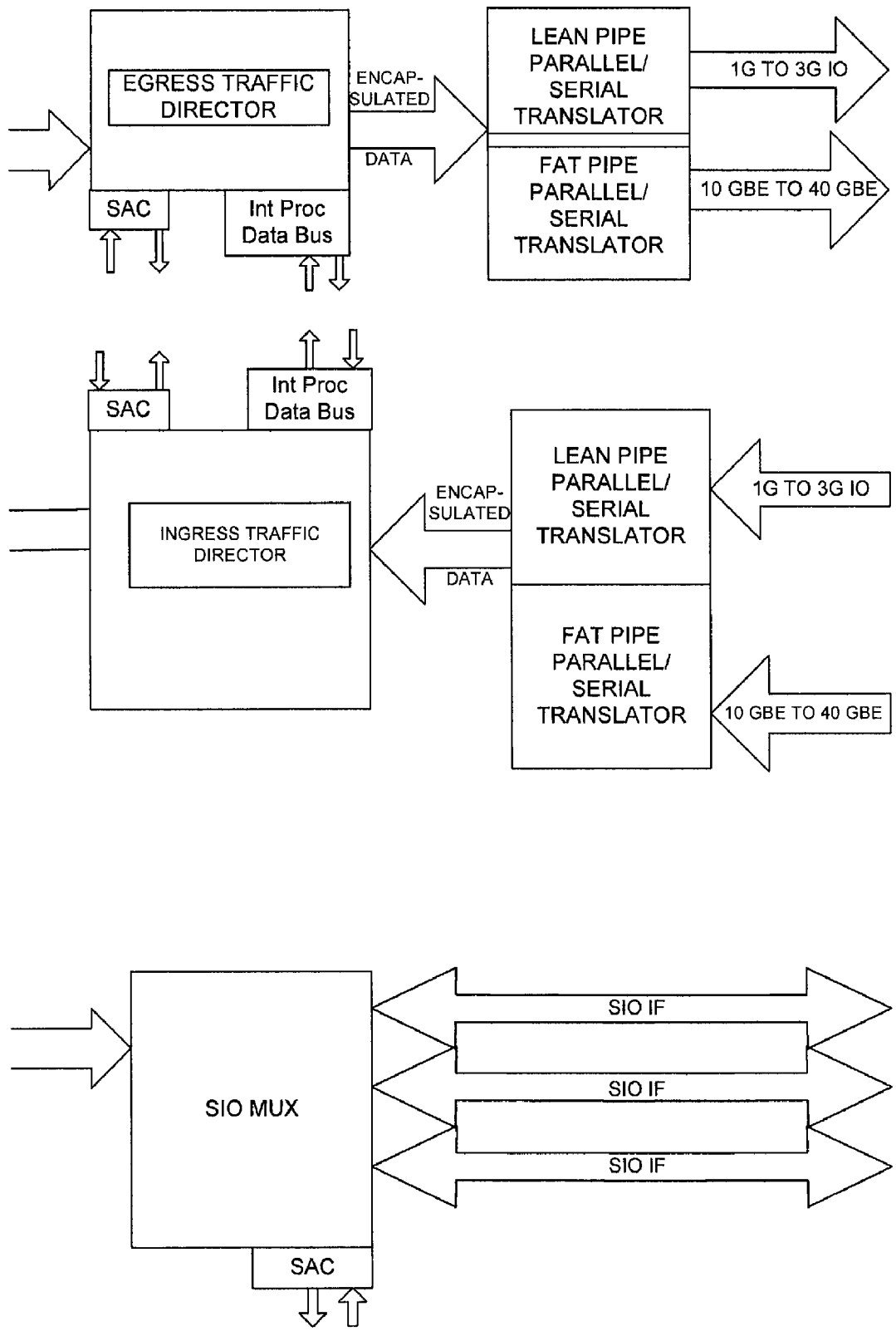

In the embodiment illustrated in block diagram form in FIG. 2, a bit stream protocol processor interconnects communications, both memory and I/O, via the Ethernet switched fabric backplane 45 at Ethernet line speeds (alternately "wire speeds") It will be appreciated that the architecture illustrated in FIG. 1 is presented by way of exemplification and not limitation. Thus the MicroTCA™ based architecture of FIG. 1 may be replaced by a typical Personal Computer (PC), well known in the art, within the scope of the present invention. The PC architecture may feature a single circuit board, referred to as a motherboard, that includes a microprocessor which acts as the central processing unit (CPU), a system memory and a local or system bus that provides the interconnection between the CPU and the system memory and I/O ports that are typically defined by connectors along an edge of the motherboard. A Northbridge/Southbridge chipset serves as the interface between the CPU, the system memory and the I/O ports. In an exemplary embodiment, the single circuit board of the PC based architecture may be used as the management controller hub card 35 of the MicroTCA™ based architecture illustrated in FIG. 1 by augmenting it with a bridge chip as illustrated in FIG. 2 and described next.

Referring now to FIG. 2, there is illustrated an embodiment of a single card, exemplified in the specific embodiment as an AMC™ card adapted for use in the MicroTCA™ based enclosure and architecture shown in FIG. 1 or alternatively as the motherboard of the PC architecture described above. In this alternate embodiment, the CPU (not shown) is operably coupled to the first type of serial data transmission interface using the front side bus 70. In a general embodiment illustrated in FIG. 2, the front side bus (FSB) 70 of a conventional prior art chip, such as the Intel® Pentium 4 microprocessor, for example, the FSB 70 and the system controller 68 (i.e. the Northbridge chipset, for instance) is interfaced to the bridge chip 50 that provides a two-way bridging function between the first and second data transmission protocols. Intel and Pentium are registered trademarks of Intel Corporation. In another embodiment, an ASIC (not illustrated) replaces the Northbridge chipset or cooperates with the Northbridge chipset. The ASIC is configured to interface with the FSB 70 to create an Ether bridge that translates memory requests to encapsulated Ethernet packets. The ASIC in turn communicates with the bit stream protocol processor 50 of this embodiment.

For a more detailed description of the embodiments of FIG. 1 that are used to describe one aspect of the present invention, reference is made to the previously-identified utility patent application entitled "TELECOMMUNICATION AND COMPUTING PLATFORMS WITH SERIAL PACKET SWITCHED INTEGRATED MEMORY ACCESS TECHNOLOG," Ser. No. 11/828,329, filed Jul. 25, 2007, and the disclosure of which is hereby incorporated by reference. It will be understood, however, that the Ethernet protocol in accordance with the present invention is applicable to numerous embodiments of physical components capable of implementing serial communication in accordance with the Ethernet protocol within a constrained network as defined herein.

In order to more clearly understand the present invention, an exemplary communication between a subset of cards of the computer system of FIG. 1 will now be described. In this embodiment, a first processor card 15 communicates with the extended memory card 30, the graphics processor card 20 and the HDD card 25 over the backplane 45 via the intermediation of the multi-port Ethernet switch 40 located on manager card 35 As illustrated in FIG. 1, a bridging chip 50 capable of transforming between communication protocols is disposed on the first processor card 15 and serves as a communication interface between said first processor card 15 and the other cards (and optionally modules) of system 10 through the intermediation of the a multi-port switch 40 located on manager card 35. In a general embodiment of the present invention as illustrated in FIG. 1, each card 65 is configured with a bridging chip 50 capable of transforming between communication protocols to serve as a communication interface between the card in question and the other cards (and optionally modules) of system 10 through the intermediation of the multi-port switch 40 located on manager card 35. In the specific embodiment discussed in relation with the illustration of FIG. 1, the bridging chip 50 is a bit stream processor based bridge chip 50 that interfaces the first processor card 15 to the switch 40 co-located with the management controller hub on the management controller hub card 35 (alternatively "manager card"). The extended memory card 30 and the graphics processor card 20 are each interfaced to the switch 40 by a separate corresponding bit stream processor based bridge chip 50 on each card. FIG. 1 illustrates the specific interconnects between the bit stream processor based bridge chips 50, the cards 15, 30, 20, 25 and the switch 40.

In another embodiment of the present invention, the system 10 may be configured to operate using a first serial communication protocol and one or more cards 15, 30, 20, and 25, may be configured to operate using one or more serial communication protocols native to the particular card but different than the first serial communication protocol. In this unrelated embodiment, each of the cards 15, 30, 20 and 25 may be adapted to use one or more bridge chips 50 that translate between the first serial communication protocol and the serial communication protocols natively used on the particular card with which the bridge chip 50 is associated. In an exemplary embodiment of the present invention, the switch 40 may be based on a bit-stream processor architecture as will become clear from the description that follows. Once again, it should be emphasized that the bit stream processor architecture is presented by way of exemplification of the bridging chip and switch chip architectures but not by way of limitation. In other embodiments, any bridging chip or switch chip may be utilized within the scope of the present invention.

Figures 3, 4:
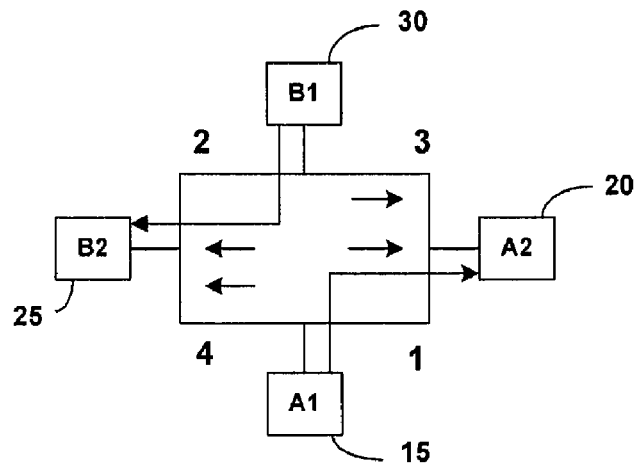
FIG. 3 illustrates a switched network and a MAC address based VLAN setup associated with the switch S1 of the computer system of FIG. 1 of the present invention.
FIG. 4 depicts a VLAN tagged Ethernet frame compliant with IEEE 802.1Q.
Figure 5:
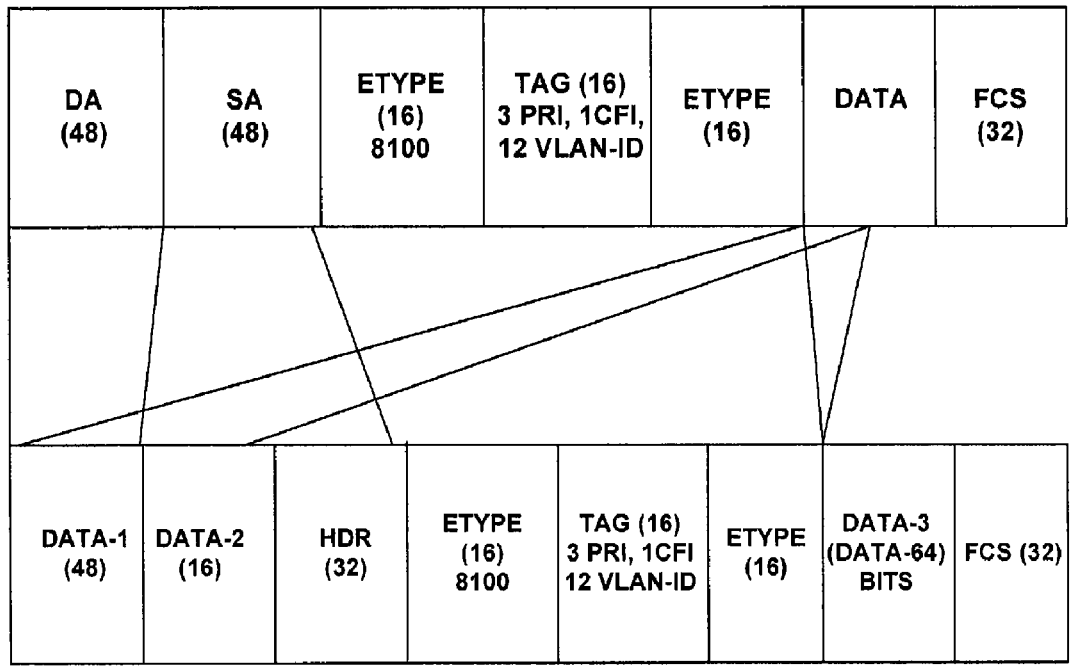
FIG. 5 illustrates an exemplary Ether-short frame in accordance with one embodiment of the present invention.

Referring now to the illustration of FIG. 3, there is illustrated in block diagram form an exemplary architecture of the switch S showing the ports 1-4 at which respective cards 15, 30, 20 and 25 are connected to the switch 40 via the Ethernet switched backplane 45. As can be seen from FIG. 3, unlike a conventional network where there would only be one Ethernet address for the entire computer system represented by FIG. 3, in accordance with the present invention each of the respective cards 15, 30, 20 and 25 (alternatively designated as A1, B1, A2, B2 respectively) and switch 40 (alternatively designated S) are each provided with a unique MAC address such that each may be addressed individually. It will be appreciated that the particular configuration of interconnections is exemplary and other configurations may be used within the scope of the present invention. Each interconnect may transmit or receive a serial data stream of packetized Ethernet data being transferred to and from the switching chip 40 and the respective card. It will be appreciated that each of such interconnects may be considered to be a segment of a physical local area network LAN (L1) that includes the switching chip 40. The Ethernet protocol is used by way of example but is not intended to limit the scope of the present invention.

In one embodiment, the switch 40 is a VLAN-aware switch capable of switching a data packet or frame based on tag information. An exemplary switch 40 of the present invention may be a Fujitsu CX-4 based, 12-port 10 Gbps Ethernet switch on a chip or the XG1200 and the XG700 switches Layer 2, non-blocking, 10 Gb family of Ethernet switches powered by Fujitsu's 12-port 10 Gb Ethernet switch chip. It will be appreciated that switch 40 may be equipped with additional ports to allow the switch to connect with one or more switches 42 (alternatively S2) and 44 (alternately S3) (which may be resident within the system 10 or in other systems outside the system 10—switches 42 and 44 are not illustrated) directly or through the switching fabric 45 illustrated in FIG. 1. Fujitsu and the Fujitsu logo are registered trademarks of Fujitsu Limited.

One of skill in the art will appreciate that the aforementioned configuration is exemplary of the present invention in that several other configurations are possible without departing from the scope of the present invention. In one embodiment, dual serial interconnects, one for reception of data and the other for transmission of data, ensure a collision free domain. Alternatively, a single interconnect may be used in place of a dual pair with appropriate signaling and synchronization of the incoming and outgoing data streams may be utilized to prevent collisions using methods well known in the art.

In other embodiments, the computer system illustrated in FIG. 1 may comprise one or more additional sets of circuit boards that communicate through one or more switches S2 to comprise additional LAN(s) (L2; not illustrated). Switches S1 and S2 may communicate over the backplane or through one or more intermediate devices in the extended network external to the computer system of FIG. 1. Each of the LANs L1 and L2, as well as each of the subsystem members of that LAN, may be members of a local network LN1 that define a constrained neighborhood for communications confined to that local network utilizing the enhanced Ethernet protocol in accordance with the present invention.

In the illustrated embodiment of the present invention in FIG. 1, each end-station (classically a computing system comprised of CPU, memory and I/O) or edge-device (an individually addressable subcomponent of a classical computing system, such as any of cards A1, B1, A2, B2 or S) is globally identified in the local and extended network by a MAC (Media Access Control) address as well as by a local logical address (the VLAN ID) which uniquely identifies the edge-device within the local network LN1 as will be described in the following paragraphs.

In one embodiment, the constrained neighborhood for purposes of the present invention is the local network within which there is a mechanism provided for allocating unique identification values in the form of a VLAN ID to each end-station and/or edge-device within the local network. In one embodiment, the local network includes an out-of-band communication path separate for the Ethernet switching fabric by which the unique identification values are set and/or communicated. In another embodiment, an in-band communication message passing communication scheme is utilized to convey information regarding the unique identification to other end-station According to one embodiment of the present invention, the edge-devices in the local network LN1 communicate with edge-devices within the local network LN1 using a first data frame format and with devices on the external network using the IEEE standard 802.3 frame format. The first data frame format is based upon a modification of the Institute of Electrical and Electronics Engineering (IEEE) draft standard, 802.1Q. A data frame configured according to the first data frame format contains information that associates the data frame with a virtual local area network (VLANs) as defined in the Institute of Electrical and Electronics Engineering (IEEE) draft standard, 802.1Q. Accordingly, the edge-devices of the local networks L1, L2 of the computer system 10 of the present invention are grouped into one or more mutually exclusive VLANs. The edge-devices within a VLAN communicate only with the other member edge-devices in the VLAN whether located on the same or separate physical LANs. VLAN membership (or a VLAN domain) can be defined by assigning specific ports on a switch to a particular VLAN or by assigning MAC addresses of specified edge-devices to the particular VLAN. In the later case, the end-device can be relocated on the network without affecting its VLAN membership. In one embodiment of the present invention, each node in a VLAN is assigned a unique identification denominated the VLAN-ID. Once an edge-device is assigned a VLAN-ID, data packets associated with the particular edge-node are identified and classified within the environment of the VLAN using this VLAN-ID.

Referring now to FIGS. 3 and 4, there is illustrated a network switch and a MAC address based VLAN setup associated with the switch S of the computer system of FIG. 1 of the present invention. FIG. 4 depicts a VLAN tagged Ethernet frame that conforms to the IEEE 802.1Q standard. The Ethernet frame format begins with a 6-byte destination MAC address field followed by a 6 byte source MAC address field. A two-byte Ethernet type (ETYPE) field follows the source MAC address field. The ETYPE field (Ethernet Type value 802.1Qtag Type) identifies a frame as a Tagged Frame. There may be two ETYPE fields. The Etype field is followed by a two-byte Tag Control Information (TCI) field. The two-byte TCI field comprises a three-bit user priority field, one bit Canonical Format Indicator (CFI) and a 12 bit VLAN Identifier (VLAN-ID) field. The 12-bit VLAN ID uniquely identifies the VLAN to which the frame belongs. A VLAN tagged frame is a tagged frame where the Tag Header comprises a VLAN-ID value other than the null VLAN ID. The VLAN-ID field may be followed by a repeating pattern of the ETYPE and the TCI fields to allow nested VLAN-IDs that allow nested VLAN implementations. The data or payload field follows the E-Type and TCI fields to complete the Ethernet frame.

Still referring to FIG. 3, the main purpose of the switch S is to relay frames between LAN segments as shown. The switch S accomplishes this by classifying the frame as belonging to one and only one VLAN and using the VLAN-ID to switch the frame to the destination node or edge-device. In this regard, each switch S generally includes a global VLAN table a MAC learning table as shown in FIG. 3. In the primary embodiment of the present invention, each bridge chip 40 maintains a tag information table. The tag information table maps each available device/module in the network to a VLAN ID or Unique ID. FIG. 2 is a block diagram illustration of the functional units of the bit stream protocol processor based bridge chip 50 of the present invention. As shown in FIG. 2, each bridge chip 50 maintains a tag information table that, in a general embodiment of the present invention, contains up to 4094 tag info entries. Each entry maps device resource to a unique VLAN ID as illustrated in Table 1 below:

| Device/Resource | Unique VLAN ID |
|---|---|
| MEMORY-DIMM-1 (A2) | VLAN-ID-1 |
| MEMORY-DIMM-2 (A2-2) | VLAN-ID-2 |
| I/O 1 (B1) | VLAN-ID-3 |
| I/O 2 (B1-2) | VLAN-ID-4 |
| . . . | . . . |

In one embodiment, each VLAN-ID from Table 1 is associated with a port number of switch 40 to generate a VLAN table shown as Table 2 below.

| VLAN ID | Port Number |
|---|---|
| VLAN-ID-1 | 1 |
| VLAN-ID-2 | 2 |
| ... | ... |

In one embodiment, Table 2 may be created manually and loaded onto each switch S at system startup. In another embodiment, each edge-device is automatically assigned a device VLAN-ID using a method such as the auto-negotiation protocol described in a following section. It will become evident to one of skill in the art that the present invention dispenses with the need for reading (learning) an address as performed in a normal Ethernet switch using the MAC-address/VLAN-tag data pair because the data frame that traverses the switch will always be tagged with a unique VLAN-ID that is either manually loaded or automatically assigned as noted above. In effect, packet flooding associated with the learning mode in standard Ethernet.

One of the features of the present invention is the capability to integrate a wide variety of functional modules (or end-stations) into the computer system of FIG. 1 without the bandwidth, latency and scalability issues commonly associated with prior art parallel bus based architectures. It must be appreciated that there is the possibility of dissimilar technologies interfering with each other. One embodiment of the present invention provides a auto-negotiation protocol whereby the bridging chips 50 and optionally the switch chip 40, each of which may be configured according to the bit stream protocol processor architecture in an exemplary embodiment of the present invention associated with edge-devices that are expected to engage in a communications transfer during operation of the system 10, arbitrate the parameters that will govern the transfer.

Referring again to FIG. 2, the bit stream protocol processor based bridge chip 40 (alternatively designated as X or Y when dissimilar from bridge chip 40) is equipped with a Resource Manager/Unique ID negotiator which provides the auto-negotiation function. The parameters that may be established by the process of auto-negotiation include, for example, the data rate, the payload, the Unique ID, and maximum frame size. In a particular embodiment, the device Unique ID is assigned through the auto-negotiation process instead of being manually assigned as discussed above. The Unique ID may be negotiated according to the data and instruction processing functions being performed at each edge-device. This can allow the Unique ID to be used to represent a signal to the edge-devices to initiate certain predefined operations. The auto-negotiation process may be based on IEEE Standard 802.3 published in 1998 or any other standard or method without digressing from the scope of the present invention. For instance, where Ethernet is the selected communication protocol, the Ethernet transceiver may include a physical coding sublayer module which implements the Physical Coding Sublayer (PCS) of the Ethernet protocol stack. The PCS functionality includes: Transmit, Synchronization, Receive and Auto-Negotiation.

In one embodiment, the bit stream processor may programmably fix the characteristics of the data frames that will be exchanged between a pair of edge-devices. In this respect, the data frame format exchanged between a pair of edge-devices over a VLAN will be substantially optimized to suit the nature of the communication exchanged rather than the one-size-fits all approach of the prior art. Any information in the standard header that is redundant or not useful within the local/constrained neighborhood may potentially be used to carry payload related or other information thereby deviating from the standard protocol. For example, the VLAN tagged Ethernet frame that conforms to the IEEE 802.1Q standard may be modified so that the packet size is 20 bytes with 8 bytes of header and 12 bytes of data. Such a modified packet would be an illegal packet in standards based networks and would be dropped ("runt" packets). However, internal to the constrained neighborhood/local network, the Ether-short frame, although it violates the Ethernet standard in that it has a corrupt header (i.e. the SA and DA fields), variable length packets (due to auto-negotiation), and other non-standard features, is recognized as a valid packet for communication exchange between a pair of edge devices due to the auto-negotiation process whereby valid communication parameters are negotiated by and for communication between a pair of edge devices connected by a communication link within the constrained neighborhood. In other unrelated embodiments, multiple messages between edge devices may be concatenated to realize a larger, standard-compliant packet, a 64 byte Ethernet packet for example, which would be a valid packet both, within the constrained neighborhood as well as outside the constrained neighborhood in the network at large where only standards compliant packets are viable.

It will be appreciated that a plurality of frame formats are possible within the scope of the present invention. Each frame format may be based on the replacement of the IEEE 802.1Q specified VLAN-ID field by the Unique ID of the edge-device obtained in the manner described in the previous paragraphs. For example, a memory request by the CPU on processor 1 card (A1) that cannot be satisfied by the cache or other local memory may be directed to the extended memory located on the extended memory card (B1). The memory request will traverse the FSB and appear as a signal at the FSB interface of the bridge chip X as shown in FIG. 2. One of skill in the art will readily recognize that the FSB signal includes an address portion, a control portion and a data portion. The Packet/Tag information Table module receives the address portion. This module is provided with a programmable function that allows the module to process the address portion and determine the Unique ID associated with the extended memory card B1.

In one embodiment, the programmability of the function may be supported through the out-of-band SAC feature controlled by the SAC controller co-located with the Resource Manager/Unique ID negotiator module. The encapsulation engine receives the data and control portions directly from the FSB interface of the bridge chip and the Unique-ID from the Packet/Tag information table module. The encapsulation engine assembles the bits in each of the data portion, the control portion and the Unique ID so that their relative positions reflect one of a plurality of Ether-short frame formats in accordance with the present invention as illustrated in FIGS. 5, 6, 8, 9 and 10, for example. It will be appreciated that one or more Ether-short frames may be generated to encapsulate the information in the signal received from the FSB. Each Ether lite frame may have a single format selected from a plurality of available formats.

In one embodiment, the selection of a particular Ether-short frame format is programmably controlled via the SAC feature controlled by the SAC controller co-located with the Resource Manager/Unique ID negotiator module. The output of the encapsulation engine is received at one of the parallel serial translator modules downstream of the encapsulation engine. The parallel serial translator serialazes and packets and transfers them over the backplane to the switch S. The switch S switches the packet based only upon the Unique ID as described in a preceding paragraph. The packets are received at the bit stream protocol processor based bridge chip Y on the extended memory card B1. The bridge chip B1 is selected to bridge between the Ether-short frame format and the protocol native to the extended memory B1.

In an exemplary embodiment, the extended memory B1 may communicate using the SPI 4.2, PCI-Express and other protocols well known to the art within the scope of the present invention. One or more Ether-short data frames representing the response of the extended memory B1 to the memory request are received at the ingress side of bridge chip X. A parallel/serial translator at the ingress parallelizes the Ether-short frame and forwards it for receipt at the decapsulation engine. The decapsulaton engine recognizes the Ether-short frame format, disassembles it into the appropriate data and control portions recognizable by the FSB and forwards it to the Packet/Tag Information module. The Packet/Tag Information module strips the Unique-ID in the incoming Ether-short frame, matches it to an address and generates the appropriate address portion which together with the data and control portions output by the decapsulation engine, comprise a response signal appropriate for transfer over the FSB to the processor on the processor 1 card. The illustrated embodiment of the bridge chip is equipped with scheduling, queuing, and traffic director modules that modulate the output of the encapsulation engine and the input to the decapsulation engine to implement QoS and other features absent in the standard Ethernet protocol. It will be apparent to one of skill in the art that the particular operations described here are exemplary of the process of bridging between two message transfer formats. Other processes may be used within the scope of the present invention.

One of the features of the present invention is that every packet traversing the switch S utilizing an Ether-short format has a Unique ID that alone is used to switch the packet at the switch S within the constrained neighborhood (i.e. the localized or contained network). This renders redundant all other fields of the packet except the FCS field. In particular, both the destination address (DA) field and the source address (SA) field of the conventional Ethernet protocol are rendered redundant. Transmitting a frame with redundant data increases the frame processing overhead and leads to the inefficiencies that have generally prevented the adoption of the Ethernet protocol for communications among sub-components of a conventional computing system. In contrast, the enhanced Ethernet protocol of the present invention makes these fields available for data payloads such that the overhead efficiency of the packet transfer may be increased, the length of the packet may be decreased, or a combination of both may occur. It must be appreciated that the computer system of the present invention still retains the capability to communicate using standard Ethernet if the network nodes that want to communicate cannot negotiate the Unique ID as a communication parameter as will be explained below.

In one embodiment, a single Ether-short frame format in accordance with the present invention may be utilized among end stations and/or edge-devices in a local network/constrained neighborhood. In another embodiment, the present invention makes use of the variable features to provide a plurality of Ether-short frame formats. Each frame format representing an optimal packet configuration for the parameters governing communications between a pair of edge-devices, for example. In an exemplary embodiment of the present invention, these parameters may be arrived at by the process of auto-negotiation. In another embodiment, the parameters may reflect the size of each flow between the two edge-devices, the frequency of such a flow and even a QoS with which the flow is to be delivered.

In one embodiment of the present invention, the encapsulation engine orders the bits in the Ether frame so that the DA field places the first 48 bits of data, the SA field places the following 16 bits of data. Since the computer appliance 10 may be connected to an external network, the edge-devices of the present invention may exchange information with one or more external edge-devices/end stations. This exchange is conducted using standard Ethernet packets necessitating the preservation of header information in a packet traversing the external network. To avoid the header processing overhead, the header information may be compressed into 4 bytes using the header compression method described in U.S. Pat. No. 6,804,238, the contents of which are incorporated herein by reference. The four-byte header is placed after the SA field. This information is used to regenerate the full header for packets transmitted to the external network. The header may also be used to support the process of segmentation and assembly as will be described in the following paragraph.

Figure 6:
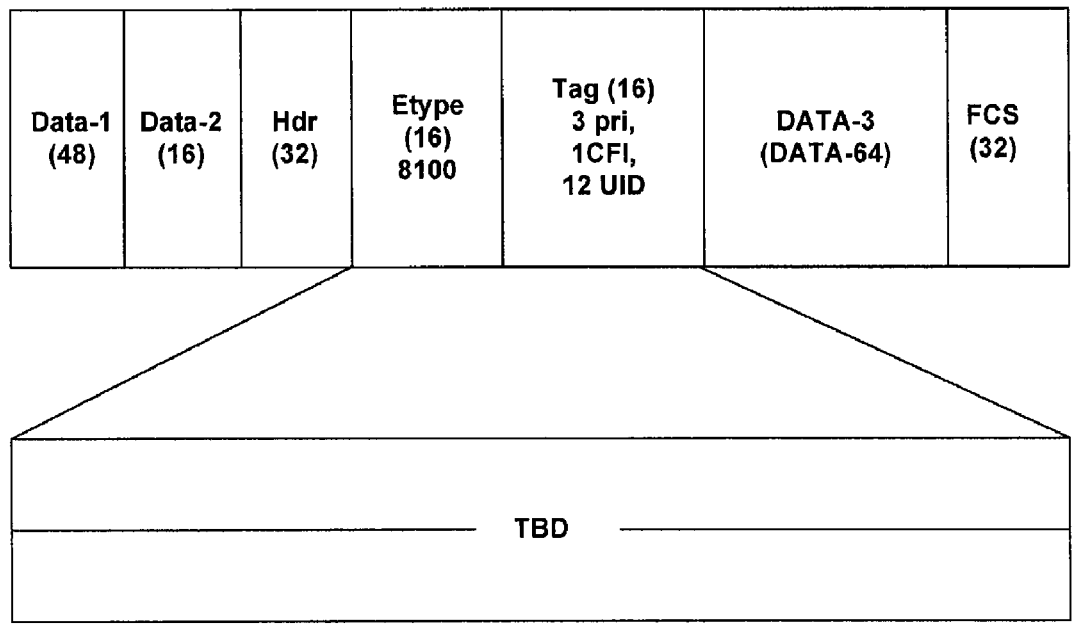
FIG. 6 depicts an exemplary header modification in the Ether-short frame of the embodiment of FIG. 5 of the present invention in which the exemplary EType is a Unique ID.

FIG. 6 illustrates another embodiment of the present invention, wherein the frame includes a defined header of 32 bits The 32-bit header includes start-of-packet (SOP), end-of-packet (EOF) information that facilitates packet delineation. To accommodate a switched environment with CoS/QoS, a 12-bit source Unique-ID and an eight-bit sequence number may be included in the header field to help identify segments belonging to the same packet. The E-Tag and the Unique-ID follow the header field. Regardless of the data placement described above, the Ether-short frame could be a "double-tagged" VLAN frame capable of accepting a stacked VLAN-ID implementation if necessary. It will be readily evident to one of skill in the art that the data frame format of the present invention provides a much improved header to data ratio in comparison to prior art approaches.

It is generally more efficient to transmit a larger frame—so that header-to-data ratio is smaller and therefore better performance results. Queues build up in a switch when traffic from several inputs may be heading for a single output. In general, once a packet is extracted from a queue and its transmittal initiated, the process will continue until the whole packet is transmitted. The longest time that a queue output can be tied up is equal to the time it takes to transmit a maximum sized packet. Fixed length cells mean that a queue output is never tied up for more than the time it takes to transmit one cell, which is almost certainly shorter than the maximally sized packet on a variable length packet network. Thus, if tight control over the latency experienced by cells when they pass through a queue is important, cells rather than the standard Ethernet frame or packet are advantageous.

In one embodiment, the bit stream protocol based bridge chip utilizes the process of auto-negotiation to fix the size of packets and a Unique ID characterizing communications between edge-devices in the computer system. The resultant Ether-short frame is then formatted according to the auto-negotiated parameters.

In an alternate embodiment of the present invention each Ether-short frame may be further segmented into cells of a fixed size using the segmentation function of the bit stream protocol processor based bridge chip. For example, a segmentation of an original 600 bytes Ether-short data frame to three fixed size cells may be performed wherein each cell carries 256 bytes of data.

In situations where each data flow is very small, but the number of data flows are large, the header-to-data ratio is very large and header processing overhead can overwhelm the computer system of FIG. 1. An exemplary situation is the use of voice packets that are very small with the payload usually lying between 20 to 150 bytes with RTP/UDP/IP header of 40 bytes (IP header=20 bytes, UDP header=8 bytes, RTP header=12 bytes). In a fixed size Ether-short frame configured for carrying 26 bytes of data, a frame with a total size of 78 bytes will be needed to transmit the 20 bytes of IP voice data. The header overhead to data ratio will amount to 30 percent. This includes the 4 bytes of padding overhead to meet the fixed frame size. A standard Ethernet frame with VLAN Tag sized to carry 64 bytes/frame will result in a header overhead to data ratio of 37 percent. Clearly, the Ether-short frame in accordance with this embodiment is more efficient because it can be programmatically altered.

The advantage of the fixed cell approach, according to one embodiment of the present invention, can be seen from the resources required to transmit 150 bytes of IP voice data. In this case, using the Ether-short frame, would require the transmission of three equal length Ether-short frames with the total header overhead/data ratio amounting to about 23 percent. Clearly, the fixed cell approach of the present invention is preferable over the standards driven variable packet sizes.

According to another embodiment of the present invention, the Ether-short frame is recognized and remains viable only within the confines of the constrained neighborhood/local network. At the time, or prior to transmitting the Ether-short data frame over a shared communications medium external to the constrained neighborhood/local network, the bit stream processor based bridge chip preferably reconfigures the frame (packet) using the segmentation and reassembly process by reinserting the Ethernet header including the SA and DA fields if needed. The reconfigured packet conforms to the Ethernet standard extant the network external to the constrained neighborhood/local network to enable the packet to be recognized and forwarded by the intermediate level devices on the network. However, internal to the constrained neighborhood/local network, the Ether-short frame violates the Ethernet standard in that it has a corrupt header (i.e. the SA and DA fields), variable length packets (due to auto-negotiation), and other non-standard features. As such, the Ether Lite frame is a technically "illegal" frame if viewed from outside of the constrained neighborhood/local network. External snooping agents that depend on recognizing the standards defined features of a frame cannot decipher the frame. Even if a frame in accordance with the Ether-short enhanced protocol were to egress beyond the constrained neighborhood/local network and appear on the external common shared medium, the errant packet meets the criteria for various early discard conditions on intermediate devices including routers, switches, bridges, hubs or edge-devices. In effect, the packet is either dropped and/or prevented from being forwarded over the shared transmission medium contributing to an inherently secure computing/communication system for the constrained neighborhood/local network.

In one embodiment, the bit stream protocol processor allows line speed QoS packet switching that is utilized to implement a simple token based communication in Ethernet. The source address (SA) and destination address (DA) and E-type like VLAN Tag is used for negotiating a unique token between end points on a communication link. The E-type extensions may be, for example, Request for UNIQUE ID or TOKEN GRANT; data communication with the granted token and request to retire the TOKEN. Once the TOKEN has been granted, the SA and DA fields are used along with the E-type to pass short date. This may also be extended to include large blocks of data for STA, and SAS. In other embodiments, once a UNIQUE ID is negotiated between end-points and an intermediate node connecting these end-points, a fixed frame size is used to endow the link with predictable performance in transferring the fixed frame and consequently meet various latency requirements. For example, the SA/DA pair could be used to transmit 12 bytes of data, 2 E-Type bytes and 2 bytes TAG, instead of the traditional 64 byte payload for a conventional Ethernet packet. In case the network nodes at the ends of a communication link fail to negotiate a unique token between them, the standard Ethernet packet protocol based communication is used between these network nodes. Such a situation may occur where one of the nodes is external to the computer system and the packets have to traverse at least a portion of the network outside the contained network. This situation may also arise within the contained network when one or both network nodes are incompatible to initiate and/or continue packet based communications using the Unique ID of the present invention. It will be appreciated that the fixed frame may be expanded or contracted to a frame of any arbitrary size that is viable within the constrained neighborhood and yet remain within the scope of the present invention.

In another embodiment, the same interface could provide a fixed 2K Block size frame for Disc—(data follows the E-Type and TAG). In this respect, the present invention enables a programmable frame size Ethernet construct as opposed to the variable frame size construct known to the art. This capability can be especially useful in iTDM type of applications because it enables packetizing TDM traffic within the framework of ATCA, for example.

One of the challenges preventing the prior extension of an Ethernet based switching fabric beyond the current level of the NIC has been the expected overhead associated with regenerating the spanning tree that represents the dynamic understanding of the topology of neighboring Ethernet connections. The increasing the number of MAC addresses that need to be assigned as a result of extending the edge of the Ethernet switching fabric beyond the NIC level will result in a predictable increase in the amount of time that is necessary to resolve the Spanning Tree Protocol (STP) that is used to update all of the nodes in the network and generate a set of neighboring Ethernet addresses when they are any changes of computing equipment within the firewall of a given organizational entity, for example.

Embodiments of the present invention may provide for several approaches to addressing the issues associated with the overhead of solution of the spanning tree protocol as a result of populating a given organizational network with a larger number of MAC addresses that extend the Ethernet fabric to the card level with the computing architecture in accordance with the present invention.

In one embodiment, MAC addresses could be assigned only at switch on MHC of a given box and an internal configuration could be used within the box with a bit stream protocol processor provided on the network edge of the switch that would be responsible for further processing of packets as they cross the box/network boundary. One internal configuration could be the use of an extended Ethernet addressing scheme within the box that would be adapted to better facilitate the transmission of shorter payload packets among the components within that box. Another internal configuration provides each card with a plurality of switched Ethernet ports, where some of those ports are effectively configured within the switch on the MHC to be only capable of internal switching and other of the ports are adapted to send packets across the box/network boundary. In each of these embodiments, the bit stream protocol processors on each card and at the MHC switch are provided with additional intelligence and information to discriminate between internal packet communications and external packet communications and also to resolve the internal addresses for packets received from outside the box.

Another embodiment would assign MAC addresses at the card level and would rely on the increasing power of the processing of the spanning tree inside a given firewall boundary to address and an assumption that changes of MAC addresses within the firewall boundary will be no more frequent than changes of MAC addresses outside the firewall boundary such that the overhead associated with the regeneration of the spanning tree would be within acceptable limits.

Another embodiment utilizes known characteristics of the picoTCA boxes within a firewall boundary that are available through the RAC/SAC, IMPI or MHC to produce a pre-simplified version of the solution to the spanning tree within that firewall boundary. Another approach is to use the reduced STP approach as described in IEEE 802.1w.

Concurrency control is also used as part of the extended Ethernet protocol. This could also "add" to the CPU wait cycles if more than one processor requests the same block of memory. In a sense that would be a component of latency because the processor and the instructions scheduled for execution cannot distinguish between data locality dependent latency (speed of access and transfer) versus concurrency control based data access "gap" because barring data mirroring concurrent access is not instantaneous access.

In one embodiment, latency and contention/concurrency issues within the Ethernet switched fabric are resolved within a "constrained network" Deterministic latency (tolerable margin jitter) through a "well contained network" (such as the packaging arrangement as described herein) is indeed possible. Switching priority, dedicated ports, such as a pseudo port to dedicated memory ports, communicating over Unique IDs between these ports are the methods to achieve this.

Finally, while the present invention has been described with reference to certain embodiments, those skilled in the art should appreciate that they can readily use the disclosed conception and specific embodiments as a basis for designing or modifying other structures for carrying out the same purposes of the present invention without departing from the spirit and scope of the invention as defined by the appended claims.

What is claimed is:

1. A communication network comprising;
constrained neighborhood of interconnected network nodes and packet switches or routers, wherein each of the said nodes and packet switches or routers further comprises:
a transmitter to transmit an improved Ethernet protocol data packet compatible with a standard Ethernet data protocol, and
receiver to receive the said improved Ethernet protocol data packet, and
the said improved Ethernet protocol data packet comprises:
destination address field of 48 bits, a source address field of 48 bits, a first Etype field of 16 bits, a Tag field of 16 bits, a second Etype field of 16 bits, a variable-length data field, and a frame check sequence field of 32 bits, for efficient communication in a predetermined value that is unused in the standard Ethernet data protocol for identifying Etype in the first Etype field or in the second Etype field for identifying the said improved Ethernet Protocol data packet; and
a supplemental header field that is adapted to support routing of the said improved Ethernet protocol data packet within the constrained neighborhood in at least a portion of one of the destination address field or the source address field; and a first fixed-length data field in at least a portion of the other of the destination address field or the source address field.

2. The improved Ethernet protocol data packet of claim 1, wherein the other of the destination address field or the source address field includes a second fixed-length data field.

3. The improved Ethernet protocol data packet of claim 2, wherein the other of the destination address field or the source address field is configured such that the supplemental header field includes 32 bits, including a 1 bit start of packet (SOP) and a 1 bit end of packet (EOP) and the second data field includes 16 bits.

4. The improved Ethernet protocol data packet of claim 1, wherein the size of the packet is programmable.

5. The improved Ethernet protocol data packet of claim 1, wherein the supplemental header field is configured to permit segmentation and reassembly of data in multiple improved Ethernet protocol data packets within the constrained neighborhood.

6. The improved Ethernet protocol data packet of claim 5, wherein at least a portion of the supplemental header field of the Ethernet protocol data packet includes a start-of-packet, end-of-packet, and a virtual local area network (VLAN) identifier.

7. The improved Ethernet protocol data packet of claim 6, wherein the Ethernet data packet permits a "double-tagged" VLAN frame capable of accepting a stacked VLAN ID implementation.

8. The improved Ethernet protocol data packet of claim 1, wherein the constrained neighborhood is a virtual local area network (VLAN) within which a unique identification field as part of the supplemental header field is used to identify unique nodes with the VLAN.

9. The improved Ethernet protocol data packet of claim 8, wherein the unique identification field is assigned in a manner compatible with Ethernet standard IEEE 802.1Q.

10. The improved Ethernet protocol data packet of claim 1, wherein Ethernet standard protocol data packet is compatible with Ethernet standard IEEE 802.3.

11. The improved Ethernet protocol data packet of claim 1, wherein the predetermined value is a defined value in the Ethernet standard protocol but is a redundant value within the constrained neighborhood.

12. A method for providing efficient communication with improved Ethernet protocol data packet compatible with a standard Ethernet data protocol having a destination address field of 48 bits, a source address field of 48 bits, a first Etype field of 16 bits, a Tag field of 16 bits, a second Etype field of 16 bits, a variable-length data field, and a frame check sequence field of 32 bits, in a constrained neighborhood of interconnected network nodes and packet switches or routers with in communication network wherein the method comprises the steps of:
A. building at transmitting node of the said constrained neighborhood an improved Ethernet protocol data packet consisting
a first data field of 48 bits;
a second data field of 48 bits;
an Etype field of 16 bits;
a Tag field of 16 bits, including a 3-bit field storing the priority level of the frame,
a 1-bit canonical format indicator (CFI), and a 12-bit VLAN ID field;
a second Etype field of 16 bits;
a third variable-length data field;

a frame check sequence (FCS) field of 32 bits;

setting one of the first Etype field or second Etype field to a predetermined value that is unused in the standard Ethernet data protocol for identifying the improved Ethernet protocol data packet;

setting a supplemental header field in at least a portion of one of the destination address field or the source address field to support routing of the improved Ethernet protocol data packet within the constrained neighborhood; and setting a first fixed-length data field in at least a portion of the other of the destination address field or the source address field; and transmitting the packet to the communication network; and B. receiving the improved Ethernet protocol data packet at a packet switching or routing node of the said constrained neighborhood;

identifying the improved Ethernet protocol data packet by examining first Etype field or second Etype for a predetermined value;

decoding the address of receiving node in the improved Ethernet protocol data packet by the supplemental header field in at least a portion of one of the destination address field or the source address field; and routing the improved Ethernet protocol data packet to the node specified in the supplemental header field; and C. receiving the improved Ethernet protocol data packet at the addressed receiving node of the said constrained neighborhood;

identifying the improved Ethernet protocol data packet by examining first Etype field or second Etype for a predetermined value;

verifying the address by examining the supplemental header field in at least a portion of one of the destination address field or the source address field; and extracting the data form the improved Ethernet protocol data packet at the receiving node of the said constrained neighborhood.

13. The method for building a improved Ethernet protocol data packet of claim 12 further comprising setting the supplemental header field to permit segmentation and reassembly of data of multiple improved Ethernet protocol data packets within the constrained neighborhood.

14. The method for building a improved Ethernet protocol data packet of claim 12 further comprising setting at least a portion of the supplemental header field of the improved Ethernet protocol data packet includes setting a start-of-packet, end-of-packet, and a virtual local area network (VLAN) identifier.

15. The method for building a improved Ethernet protocol data packet of claim 14 further comprising setting the supplemental header field of the improved Ethernet protocol data packet to permit a "double-tagged" VLAN frame capable of accepting a stacked VLAN ID implementation.

16. The method for building a improved Ethernet protocol data packet of claim 12 wherein the constrained neighborhood is a virtual local area network (VLAN) and wherein the method further comprises:

setting a unique identification field as part of the supplemental header field to identify unique nodes with the VLAN; and utilizing the unique identification field to route the improved Ethernet protocol data packets with the VLAN.

17. The method for building a improved Ethernet protocol data packet of claim 16 wherein setting the unique identification field is accomplished in a manner compatible with Ethernet standard IEEE 802.1Q.

18. The method for building a improved Ethernet protocol data packet of claim 16 wherein the method of building the improved Ethernet protocol data packet is compatible with Ethernet standard IEEE 802.

* * * * *